US005489468A

United States Patent [19]

Davidson

[11] Patent Number: 5,489,468

[45] Date of Patent: Feb. 6, 1996

[54] SEALING TAPE FOR CONCRETE FORMS

[76] Inventor: Glenn R. Davidson, 305 Kennerly Way, Peachtree City, Ga. 30269

[21] Appl. No.: 270,771

[22] Filed: Jul. 5, 1994

[51] Int. Cl.[6] .................... B32B 5/18; B32B 5/26

[52] U.S. Cl. .................... 428/261; 52/717.03; 52/717.04; 428/317.3; 428/343; 428/354

[58] Field of Search .................... 428/317.3, 40, 428/354, 343, 317.1, 317.7, 255, 261; 52/717.03, 717.04

[56] References Cited

U.S. PATENT DOCUMENTS

| | | | |
|---|---|---|---|
| 3,262,827 | 7/1966 | Kallander et al. | 428/317.3 X |
| 4,668,565 | 5/1987 | Murachi | 428/317.3 X |
| 4,705,715 | 11/1987 | DeCoste, Jr. et al. | 428/317.3 X |
| 4,844,973 | 7/1989 | Konishi et al. | 428/317.3 X |
| 4,942,071 | 7/1990 | Frye | 428/317.3 X |
| 5,108,815 | 4/1992 | Adams et al. | 428/261 X |

FOREIGN PATENT DOCUMENTS

| | | | |
|---|---|---|---|
| 163045 | 12/1985 | European Pat. Off. | 428/317.3 |
| 57-115327 | 7/1982 | Japan | 428/317.3 |
| 1304170A | 12/1989 | Japan | 428/317.3 |

*Primary Examiner*—George F. Lesmes
*Assistant Examiner*—Blame R. Copenheaver
*Attorney, Agent, or Firm*—James B. Middleton

[57] ABSTRACT

A sealing tape for concrete forms has a foam layer to fill spaces between parts of the form, and pressure sensitive adhesive for adhering to the form. The side of the sealing tape to be fixed to the base plate of the form is a fabric reinforced tape with sufficient integrity that the sealing tape can be entirely removed from the base plate by merely pulling up the reinforced tape. For some forms, the sealing tape may have an adhesive on both sides, and for other forms, only the side having the reinforced tape may have adhesive thereon.

3 Claims, 1 Drawing Sheet

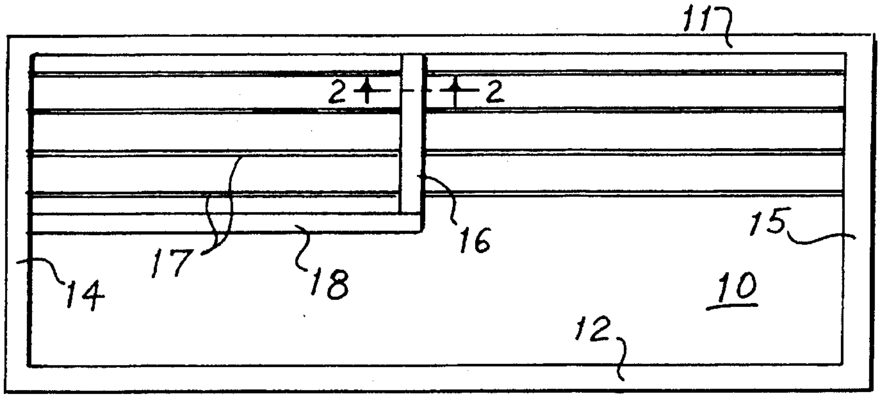
FIG. 1
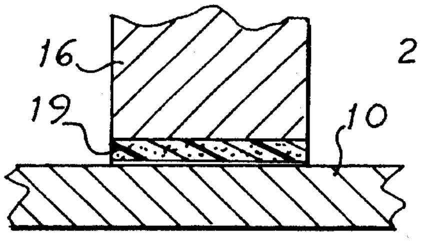
FIG. 2
FIG. 3
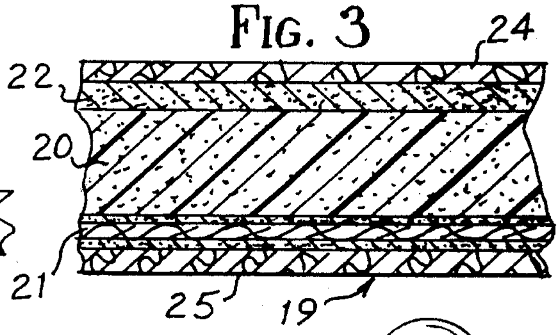
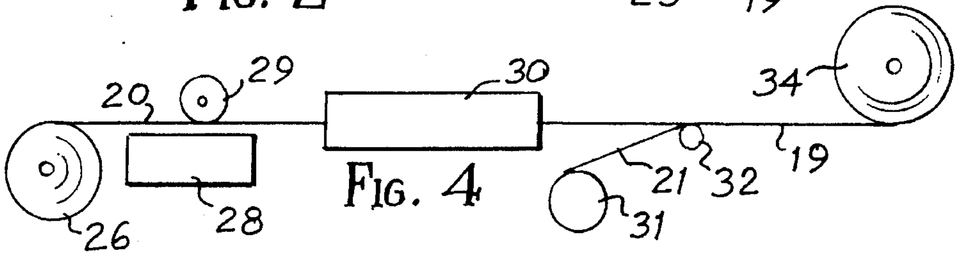
FIG. 4
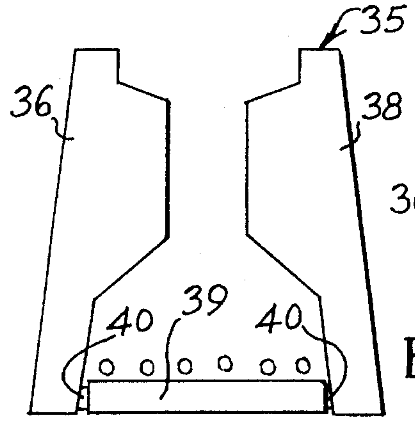
FIG. 5
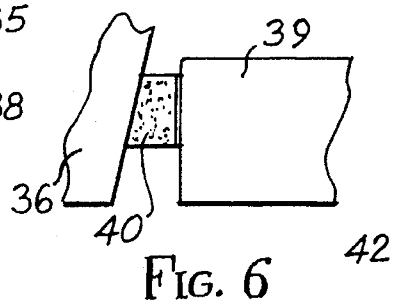
FIG. 6
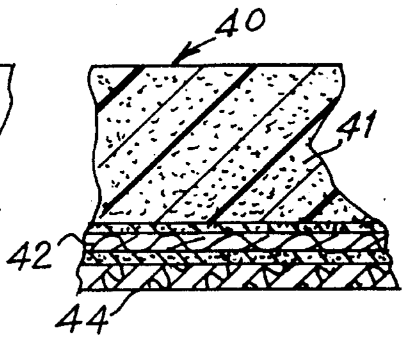
FIG. 7

SEALING TAPE FOR CONCRETE FORMS

BACKGROUND OF THE INVENTION

1. Field of the Invention

This invention relates generally to the casting of concrete or the like, and is more particularly concerned with a sealing tape for sealing adjacent pieces of a concrete form.

2. Discussion of the Prior Art it is common practice to cast concrete shapes by utilizing a large form, and providing intermediate walls and the like within the form to delineate the particular size and shape desired. Intermediate walls, brick anchor slots, flashing riglets, forming revels, blockouts and connection plates are typically adhered to the base of the large form by means of a double-sided adhesive tape, and of course appropriate structural braces are used to withstand the outward forces of the concrete. The concrete is poured, allowed to set, and the forms removed. Before a new setup can be made, the adhesive tape must be removed from the large form. The two sided adhesive tape will usually remain on the base plate of the large form, and must be scraped up. Of course, care must be taken in the scraping, or the base plate will be marred, causing blemishes on subsequently cast pieces. Since building curtain walls are formed in the manner described, it will be understood that the surface finish of the cast panel is very important.

In this prior art technique, a tape made of a flexible foam is generally used, the foam being important to fill the small openings between the wall, or other device being stuck to the form, and the base plate due to slight variations in the pieces. While the foam works well in sealing the openings, the flexible foam material is not strong enough to hold together to pull up the adhesive tape. The natural result is that portions of the tape remain on the base plate and must be scraped up or otherwise forcibly removed.

SUMMARY OF THE INVENTION

The present invention provides a sealing tape for concrete forms, the seal comprising a reinforced tape laminated to a flexible foam tape. For applications wherein the tape of the present invention is used to adhere form parts such as intermediate walls, brick anchor slots, flashing riglets, forming revels, blockouts or connection plates to the base plate of a large form, an adhesive coating is placed on the flexible foam, so the resulting seal has adhesive on opposed surfaces. For applications wherein the tape of the present invention is used somewhat as a compressive seal, only one surface may have an adhesive, and this one surface will be the one formed by the reinforced tape.

In the large form, therefore, after the form parts are removed, one can pick up the reinforced tape and strip the tape from the base plate. The reinforcing is sufficient that the tape has greater integrity than the cohesive force of the adhesive, so the entire piece of tape can be removed intact.

BRIEF DESCRIPTION OF THE DRAWINGS

These and other features and advantages of the present invention will become apparent from consideration of the following specification when taken in conjunction with the accompanying drawings in which:

FIG. 1 is a top plan view of a conventional large form for casting concrete shapes, and having intermediate walls or other form parts therein;

FIG. 2 is a fragmentary enlarged cross-sectional view taken along the line 2—2 in FIG. 1;

FIG. 3 is an enlarged, fragmentary cross-sectional view taken through the tape used in the embodiment shown in FIG. 2;

FIG. 4 is a schematic view illustrating a process for making the tape shown in FIG. 3;

FIG. 5 is a front elevational view showing a different concrete casting system which uses a different embodiment of the present invention;

FIG. 6 is an enlarged, fragmentary view showing the seal of the present invention as used in the system of FIG. 5; and, FIG. 7 is an enlarged, fragmentary cross-sectional view taken through the tape used in the embodiment shown in FIG. 6.

DETAILED DESCRIPTION OF THE EMBODIMENTS

Referring now more particularly to the drawings, and to those embodiments of the invention here presented by way of illustration, FIG. 1 of the drawings is a top plan view of a conventional concrete casting form. The form includes a base plate 10 having side walls 11 and 12, and end walls 14 and 15. Those skilled in the art will understand that the base plate 10 will usually be quite large, and the piece to be cast generally requires less than the entire base plate 10. Thus, the usual casting is accomplished using a portion of an end wall, such as the end wall 14, and a portion of a side wall, such as the side wall 11, in combination with two intermediate walls 16 and 18.

Those skilled in the art will understand that, in casting concrete or the like, tape made in accordance with the present invention can be used for adhering numerous form parts including intermediate walls, brick anchor slots, flashing riglets, forming revels, blockouts and connection plates. By way of example, intermediate walls 16 and 18 are here shown, but this is not to be construed as limiting the invention.

The intermediate wall 16 is parallel to the end wall 14, and the intermediate wall 18 is parallel to the side wall 11. The intermediate walls 16 and 18 are placed on the base plate 10 to form a rectangle or other shape to be cast. As here shown, there are stressed reinforcing members 17 passing through the space for the casting. Those skilled in the art will understand that these reinforcing members are conventionally used.

The present invention relates to the sealing of the intermediate walls 16 and 18 or other form parts with respect to the base plate 10. Since concrete is a fluid at the time it is poured, it will be realized that concrete can flow into small interstices, which can cause defects on the surface. Looking at FIG. 2 of the drawings it will be seen that the intermediate wall 16 has a piece of sealing tape 19 between the wall 16 and the base plate 10. The sealing tape 19 includes a flexible foam to seal all openings between the wall 16 and the base plate 10.

The sealing tape 19 is shown in more detail in FIG. 3 of the drawings. In FIG. 3, the flexible foam layer 20 is shown as relatively thick, since this is the layer depended on to fill cracks caused by variations in the walls and/or the base plate.

On the bottom of the foam layer 20, there is a reinforced tape 21. It is contemplated that numerous reinforced tapes may be used, but one successful embodiment has been made using a tape consisting of a woven cloth of polyester and cotton, the cloth being coated on both sides with a pressure sensitive adhesive intended for industrial applications. Such a tape is available from Shuford Mills, Inc., in Hickory, N.C. under the name "Shurtape DF-642". The opposite surface of the tape 19 has a coating of an adhesive 22, yielding a two-sided adhesive tape 19. As shown in FIG. 3, there are release papers 24 and 25 covering the adhesives on opposite sides of the tape 19. Use of such release papers is well known in the art and does not require further description.

In view of the above and foregoing description, it should be understood that lengths of the tape 19 can be placed between the intermediate walls such as the walls 16 and 18, and the adhesives 21 and 22 will cause the tape 19 to adhere to both surfaces, while the foam 20 fills all spaces between the two surfaces. Appropriate bracing will be provided, and concrete will be poured into the form.

After the concrete is set, the walls 16 and 18 are removed, and the base plate 10 is cleaned to be ready for the next casting. The fabric tape 21 will be fixed to the base plate 10, with the foam layer 20 thereon; thus, one can grasp the reinforced tape 21 and pull it from the base plate 10. No additional scraping or the like is required.

FIG. 4 of the drawings shows a technique for making the tape 19 shown in FIG. 3. From the above description it will be realized that the components are purchased, and the tape assembled. The foam layer 20 is fed from a supply 26. The foam 20 is guided along a path, and a coater 28 applies the layer of adhesive 22 by means of the coating roll 29. The adhesive layer 22 is then cured in the oven 30.

After the oven 30, there is a supply 31 of the reinforced adhesive tape 21. Since the adhesive tape 21 is two-sided, the adhesive on one side is used to laminate the tape 21 to the foam layer 20. Thus, the tape is pressed against the foam layer 20 by the laminating roll 32. The tape 19 is then complete, except for release papers 24 and 25 which can be applied as is well known in the art. The product can then be rolled up as at 34.

A modification of the sealing tape 19 is admirably suited for a slightly different concrete casting application, as is shown in FIGS. 5–7.

FIG. 5 shows a concrete form generally designated at 35, the form 35 including two side members 36 and 38, and a base plate 39. Since the base plate 39 is between the walls 36 and 38, it will be recognized that fluid concrete may leak through the joint unless the joint is sealed. As here shown, there is a sealing tape 40 in each of the joints.

The joint between the wall 36 and the base plate 39 is shown larger in FIG. 6, and it can be seen that the sealing tape 40 includes a flexible foam layer that fills the gap. The gap is shown exaggerated for clarity.

The sealing tape 40 is shown in detail in FIG. 7. The tape 40 includes the flexible foam layer 41 having the reinforced tape layer 42 like the layer 21 of the tape 19. The layer 42 may be covered by a release paper 44 as has been discussed above.

It will therefore be seen that the tape 40 is generally the same as the tape 19, but the tape 40 does not have the additional adhesive layer. The tape 40 is used more as a gasket or the like, the resilient foam effecting the sealing without the necessity for an adhesive. The method for producing the sealing tape shown in FIG. 4 can therefore be used to produce either tape 19 or tape 40, by using, or not, the coater 28.

Those skilled in the art will readily understand that virtually any flexible foam can be used as the foam layer 20 or 41. The precise material may be selected to suit the environment, the force of holding required or the like. Foams are readily available in sheet, or roll, form, and are specified by such parameters as deflection force, tear strength etc.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. In a form for pouring concrete wherein said form comprises a base plate and at least one selectively placeable form part adjacent to said base plate for confining the concrete on said base plate and including a flexible foam sealing tape between said form part and said base plate, the improvement wherein said sealing tape comprising a laminate of a flexible foam layer for filling spaces between said form part and said base plate, and a reinforced tape between said foam layer and said base plate, said reinforced tape comprising a woven fabric, a first adhesive layer between said foam layer and said woven fabric and a second adhesive layer between said woven fabric and said base plate, so that said reinforced tape can be pulled from said base plate and thereby remove all of said sealing tape.

2. The combination as claimed in claim 1, wherein said sealing tape further includes a third adhesive layer on said foam layer, between said foam layer and said form part.

3. The combination as claimed in claim 2, wherein said second and third adhesive layers consist of pressure sensitive adhesive.

* * * * *